US005525174A

United States Patent [19]
Gold

[11] Patent Number: 5,525,174
[45] Date of Patent: Jun. 11, 1996

[54] AUTO WINDSHIELD MOLDING AND METHOD OF INSTALLATION

[76] Inventor: Peter Gold, 389 Peninsula Blvd., Hempstead, N.Y. 11550

[21] Appl. No.: 392,220

[22] Filed: Feb. 22, 1995

[51] Int. Cl.⁶ .............................. B60J 1/02; B60J 10/02; E06B 3/62
[52] U.S. Cl. ...................... 156/108; 296/93; 296/146.15; 296/201; 52/208
[58] Field of Search ................................... 156/108, 217; 296/93, 146.15, 201; 52/208

[56] References Cited

U.S. PATENT DOCUMENTS 4,523,783  6/1985  Yamada .................................. 296/93
5,297,843  3/1994  Yada et al. .
5,311,711  5/1994  Desir, Sr. ................................. 52/208

Primary Examiner—Michael W. Ball
Assistant Examiner—Sam Chuan Yao

[57] ABSTRACT

An auto windshield molding which is installed by being inserted, after the sized windshield is seated in an oversized opening, in the gap between the peripheral edge of the windshield and a wall bounding the windshield opening, characterized by a hand-shapable construction material (i.e. Ethylene Propylene Di-Monomer) so that using this material to advantage the installer embodies circular shapes at locations therealong which conform to the small radius bends or corners of the gap, and thus obviates the use of metal corner shapes.

1 Claim, 1 Drawing Sheet

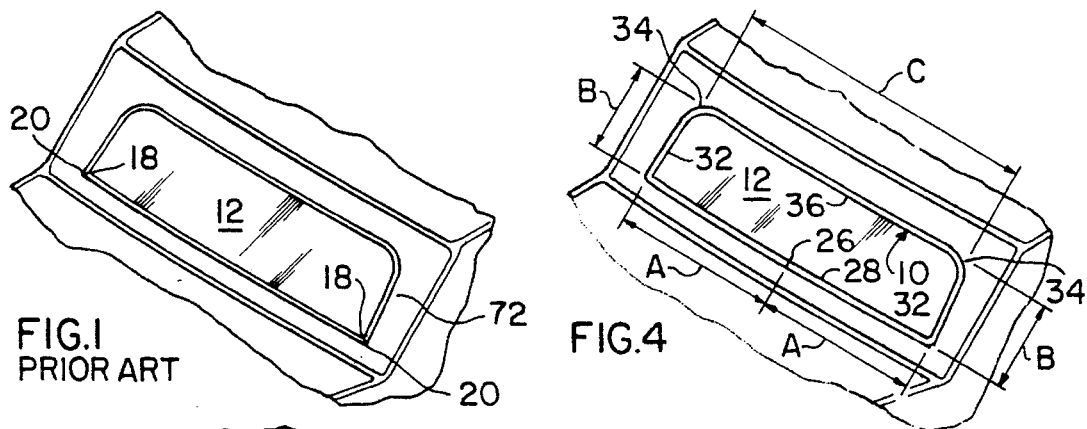
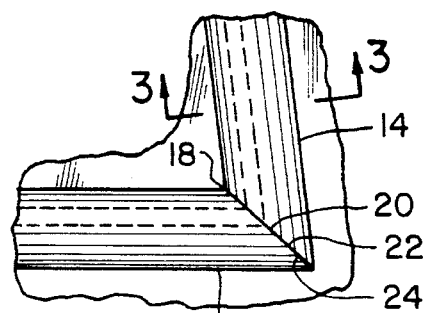
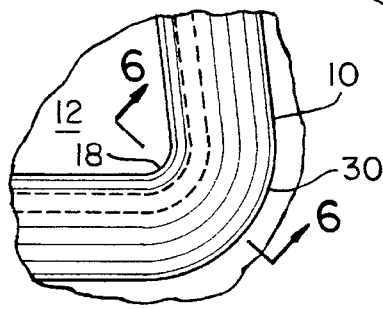
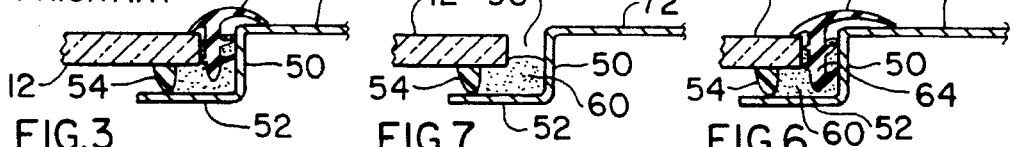
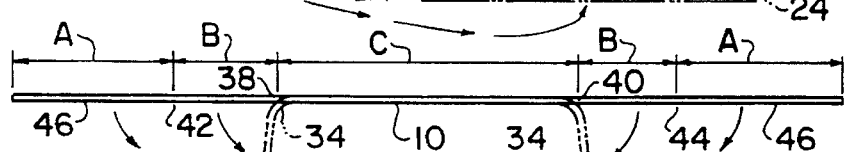
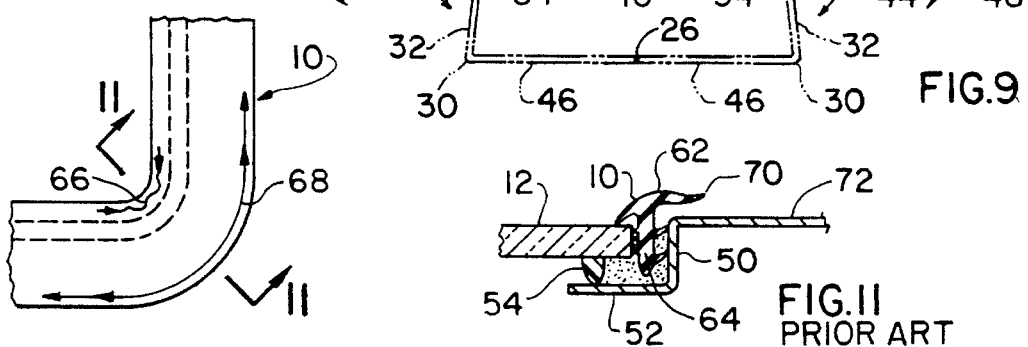
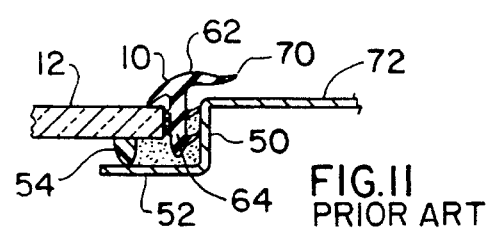

AUTO WINDSHIELD MOLDING AND METHOD OF INSTALLATION

The present invention relates generally to an auto window molding, referred to in the trade as a window reveal molding, and more particularly to a molding or trim that can be used as one continuous piece, having been cut to size from an extrusion thereof, and fitted about the window without the use of separate corner pieces, or mitered joints at the corners.

BACKGROUND OF THE INVENTION

1. Field of the Invention current practice contemplates the use of an extruded resilient plastic reveal molding for a vehicle body window installation which has a decorative trim or crown portion adapted to bridge the space between the window glass or pane and the body opening in overlying engagement therewith. The molding is of the type having a stem extruded integral with the decorative trim portion and extending generally normal therefrom for insertion into the space preparatory to achieving a bond between an adhesive sealant previously placed in the space and the stem. While generally effective for the purposes intended, when the window corners are 90 degrees or approach this sharp angle of changing direction, i.e. are of a small radius turn, the known prior art molding cannot be used at the corners because they exhibit crumpling or crimping in their inner edge. Thus in these corners, separate corner pieces must be used and the prior art molding is used in the straight length portions therebetween. A prior art alternative to the use of corner pieces is to use two lengths of molding and join these lengths using a miter joint at the small radius corners.

In contrast, the inventive window molding can be used entirely about the periphery of the window, and specifically can be fitted in small radius corners, and still contribute to a finished, commercially acceptable appearance.

2. Description of the Prior Art

U.S. Pat. No. 4,165,119 issued on Aug. 21, 1979 to Hedeen et al., describes a window reveal plastic molding 50 which, according to accepted practice, has retrorse fins 58–68 on opposite sides of a depending stem 54 to center the top decorative trim portion or crown 52 over the gap between the window glass or pane 24 and window opening 22. This patent is instructive generally on the prior use of reveal molding and is noted for this reason, but does indicate how reveal molding can be used effectively in corners approaching 90 degrees.

U.S. Pat. No. 4,523,783 issued on Jun. 18, 1985 to Yamada et al. does address the problem experienced using reveal molding in a sharply curved corner, and illustrates in FIG. 3 the unsightly crumpling that occurs in the inner edge of the molding in this circumstance. As a solution, Yamada proposes flexuring of depending legs on the molding to counter the crumpling tendency.

SUMMARY OF THE INVENTION

Broadly it is an object to provide a one-piece molding overcoming the foregoing and other shortcomings of the prior art.

More particularly, it is an object to use a pre-shapable Ethylene Propylene Di-Monomer (EPDM) construction material for an extruded molding and to employ an installation technique which uses to advantage this construction material to obviate the corner-fitting problems experienced according to prior art practice. That is, at no time in preparation for the installation, during the installation while the urethane is undergoing curing, or after the urethane cures or hardens, is there any manifestation of crumpling or crimping in a small radius bend of the molding as might otherwise detract from the appearance thereof, all as will be better understood as the description proceeds.

BRIEF DESCRIPTION OF THE DRAWING

The description of the invention which follows, together with the accompanying drawings should not be construed as limiting the invention to the example shown and described, because those skilled in the art to which this invention appertains will be able to devise other forms thereof within the ambit of the appended claims.

FIG. 1, labelled prior art, is a perspective view of an auto front windshield positioned in a slightly oversized opening with an elastomeric molding installed in said gap of said oversized opening according to prior art methods;

FIG. 2 is a partial perspective of FIG. 1 showing the lower right hand corner of said prior art molding installation, the lower left hand corner being a mirror image thereof;

FIG. 3 is a side elevational view as taken along line 3—3 of FIG. 2 illustrating details of the prior art molding installation at the corner locations;

FIG. 4 is a perspective view of an auto front windshield similar to FIG. 1, but having a molding installed in accordance with the method of the present invention;

FIG. 5, like FIG. 2, is a partial perspective view of the lower right corner of the within inventive molding installation provided for comparison with the prior art corner installation of FIG. 2, the lower left hand corner being a mirror image thereof;

FIG. 6 is a side elevational view as taken along line 6—6 of FIG. 2 illustrating details of the within inventive corner molding installation;

FIG. 7 is a side elevational view of a gap between a windshield and an oversized opening preparatory to installation of a molding into said gap, whether by prior art or the within inventive installation methods;

FIGS. 8 and 9 are similar views showing the size relationship between the auto windshield and cooperating moldings; the former FIG. 8 being exemplary of the prior art and the latter FIG. 9 being illustrative of the present invention;

FIG. 10 is a view similar in perspective to FIG. 5, but of a prior art installed molding; and FIG. 11 is a cross sectional view showing details of the molding installation depicted in FIG. 10.

DESCRIPTION OF THE PREFERRED EMBODIMENT

The present invention is concerned with a method of installing a molding 10 of elastomeric construction material about the periphery of a front auto windshield 12 which as best shown in FIG. 4, is characterized by consisting of a single length portion disposed in encircling relation about the windshield. In contrast and as exemplified by the prior art practice depicted in FIGS. 1 and 8, a similarly shaped and sized windshield 10 typically uses two molding length portions, namely an inverted U-shaped configuration 14 and a lower edge section 16, for the reason, as may be best understood from FIG. 2, that the shape of the small radius bend in the lower right (and left) corner 18 cannot be smoothly assumed by the molding and thus requires use a so-called mitered joint 20 at the juncture of an end 22 of said one U-shaped length portion 14 and a cooperating end 24 of said second lower edge section 16.

Underlying the present invention is the recognition that in selecting EPDM elastomeric construction material for extrusion of the molding 10 that there is provided a hand-shapable option to greatly facilitate the installation of the molding wherein, more particularly, and as best understood from FIG. 5, the installed molding 10 according to the within inventive method and as will be subsequently described in detail, smoothly assumes the shape of the lower right hand (and left hand) corner 18, thereby obviating the need for a mitered joint and consequently an equivalent of the prior art lower edge section 16 in addition to the molding length portion 14 for the remaining peripheral edge of the windshield 12, said prior art two molding length portions 14 and 16 being shown and their cooperating interrelationship best understood from FIG. 8.

Preparatory to exercising the hand-shaping option of the within inventive installation method, said method contemplates establishing locations at which corner shapes are embodied in the molding 10. That is, as best understood from FIGS. 4 and 9, starting at a midpoint 26 along the bottom windshield edge 28, it is required to measure in opposite directions the similar distances A to the first encountered lower left and right corners 30, then the distances B along the windshield opposite side edges 32 to the second encountered upper left and right corners 34, and the distance C along the windshield top edge 36, the two distances A and B and distance C providing the overall length of the molding 10 to encircle the windshield 12.

As next shown in FIG. 9, molding 10 is cut to the length necessary to encircle the windshield 12, and using as a guide from the medial length C there is marked at opposite ends thereof hand-shaping location 38 and 40 coinciding with the windshield upper corners 34, and at the ends of the side lengths 32 hand-shaping locations 42 and 44 coinciding with the windshield lower corners 30, thusly leaving opposite molding lengths 46 to be placed in adjacent position along the windshield lower edge 48. At each of the locations 38, 40, 42 and 44, the installer will shape by hand a small radius bend in the molding 10, which hand-shaped circular configurations will remain in the molding 10 because the EPDM elastomeric material is devoid of "memory" as might otherwise urge the circularly curved locations 38, 40, 42 and 44 to return to a straight configuration.

As understood, and as depicted in FIG. 7, the front windshield opening is bounded by a vertical wall 50 having a lateral flange 52 and the windshield 12 with an adhesively attached depending dam 54 is positioned in the slightly oversized opening 56 thereby providing a gap 58. Urethane 60 or other appropriate sealant is deposited, as shown in FIG. 7, into the gap 56 and, as next shown in FIG. 6, molding 10 which in cross section includes a crown 62 and a depending leg 64 is inserted into the gap 58 such that the leg 64 projects into the urethane mass 60, and the molding pre-shaped corner-like configurations at the locations 38, 40, 42 and 44 smoothly assume, as shown in FIG. 5, positions which encircle the windshield corners 30 and 34 because the respective shapes of the windshield corners 30 and 34 and the shapes pre-formed in the molding at the locations 38, 40, 42 and 44 conform with each other.

In contrast, while along straight lengths of the windshield such as depicted in FIGS. 2 and 3, the non-EPDM elastomeric molding of the prior art will result in said molding crown 62 serving effectively as a closure for the gap 58 when the depending leg 64 is engaged in the cured urethane mass 60, this result does not occur in a non-EPDM elastomeric molding at a small radius bend. Instead, and as illustrated in FIGS. 10 and 11, along a small radius bend or turn, the inner edge of the crown crimps, as at 66, due to compression, while the outer edge stretches, as at 68, which results, as shown in FIG. 11, in the outer crown portion 70 lifting out of contact with the auto body 72 and failing to effectively serve as a weather barrier seal. To overcome this prior art short-coming, the prior art practice is to use a mitered joint 20 at the windshield lower right and left corners 18.

As a patentable advance, it is herein proposed to embody corner-shapes in the molding 10 at locations coinciding with the windshield corners 30 and 34, thereby obviating the need to use mitered joints. Said corner-shapes are readily made by hand in EPDM elastomeric material of a type which, at 70 durometer, exhibits a nominal resistance to shape change from its extruded shape, and which heretofore has not been known for use as an auto reveal molding. More particularly, EPDM is the acronym for Ethylene Propylene Di-Monomer elastomeric material and is commercially available from Colonial Rubber Works, Inc. of Dyersburg, Tenn., and like sources of compound polymers. EPDM elastomeric materials at significantly high durometer characteristics, e.g. 90A durometer, are described along with extrusion instructions in U.S. Pat. No. 5,311,711 issued to Julio Desir, Sr. for "J-Type Window Lace Assemblies" on May 17, 1994, but are too inelastic for practicing the within inventive molding-installation method as hereinbefore described.

While the auto windshield molding for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. For an auto having wall means bounding a front opening sized to receive therein a selectively sized and shaped windshield, an improved method of installing a windshield molding of extruded EPDM elastomeric construction material characterized by being hand-shapable, said installation of said molding being about a peripheral edge of a windshield of a rectangular shape bounded by a top edge, opposite side edges and a bottom edge interconnected to each other by corners of curved configuration, said installation method comprising the steps of determining the distances from a mid-point of said windshield bottom edge to first encountered opposite bottom side of said curved corners and to second encountered opposite top of said curved corners thereof, cutting to size a length of said windshield molding preparatory to the positioning thereof in encircling relation about said bottom edge, opposite side edges, top edge and said interconnecting curved corners forming said peripheral edge of said windshield, marking starting from opposite ends of said side molding four hand-shaping locations therealong corresponding to said determined distances corresponding to said opposite bottom and top curved corners of said windshield, hand-shaping at each said hand-shaping location a radius bend in said molding forming a curved configuration therein adapted to fit about a cooperating curved corner of said windshield, placing said windshield in said auto front opening with said windshield peripheral edge in a clearance position from said auto opening-bounding walls to form a gap therebetween, depositing an adhesive mass in said gap, and inserting said windshield molding as previously hand-shaped into said gap and into said deposited adhesive, whereby the molding installation is facilitated by the conforming radius bent shapes of said hand-shaped molding to the corner shapes of said windshield.

* * * * *